United States Patent
Strong et al.

(10) Patent No.: US 11,734,560 B2
(45) Date of Patent: *Aug. 22, 2023

(54) SYSTEMS AND METHODS FOR AUTOMATIC ESTIMATION OF OBJECT CHARACTERISTICS FROM DIGITAL IMAGES

(71) Applicant: OmniEarth, Inc., Arlington, VA (US)

(72) Inventors: Shadrian Strong, Bellevue, WA (US); David Murr, Minneapolis, MN (US); Lars P. Dyrud, Crownsville, MD (US)

(73) Assignee: OmniEarth, Inc., Arlington, VA (US)

( * ) Notice: Subject to any disclaimer, the term of this patent is extended or adjusted under 35 U.S.C. 154(b) by 232 days.

This patent is subject to a terminal disclaimer.

(21) Appl. No.: 17/193,651

(22) Filed: Mar. 5, 2021

(65) Prior Publication Data
US 2021/0264217 A1 Aug. 26, 2021

Related U.S. Application Data

(63) Continuation of application No. 16/118,021, filed on Aug. 30, 2018, now Pat. No. 10,943,149.
(Continued)

(51) Int. Cl.
*G06N 3/08* (2023.01)
*G06F 16/51* (2019.01)
(Continued)

(52) U.S. Cl.
CPC .............. *G06N 3/08* (2013.01); *G06F 16/51* (2019.01); *G06F 16/5854* (2019.01);
(Continued)

(58) Field of Classification Search
CPC .. G06K 9/6262; G06K 9/6267; G06K 9/6274; G06F 16/5854; G06F 16/51; G06N 3/0454; G06N 3/08
See application file for complete search history.

(56) References Cited

U.S. PATENT DOCUMENTS

| 5,793,888 A | 8/1998 | Delanoy |
| 6,504,571 B1 | 1/2003 | Narayanaswami et al. |

(Continued)

FOREIGN PATENT DOCUMENTS

| GB | 2554361 A | 4/2018 |
| WO | WO 2016/054694 | 4/2016 |
| WO | WO 2006/120724 | 11/2016 |

OTHER PUBLICATIONS

PCT International Search Report and Written Opinion regarding PCT Patent App. No. PCT/US17/39567 dated Sep. 28, 2017.
(Continued)

*Primary Examiner* — Fayyaz Alam
(74) *Attorney, Agent, or Firm* — Dunlap Codding, P.C.

(57) ABSTRACT

Methods and systems for automatic estimation of object characteristics from a digital image are disclosed, including a method comprising sub-dividing into two or more segments a digital image comprising pixels and depicting an object of interest, wherein each segment comprises two or more pixels; assessing content depicted in one or more of the segments for a predetermined object characteristic using machine learning techniques comprising General Image Classification of the one or more segments using a convolutional neural network, wherein the General Image Classification comprises analyzing the segment as a whole and outputting a general classification for the segment as a whole as related to the one or more predetermined object characteristic; and determining a level of confidence of one or more of the segments having the one or more predetermined object characteristic based on the General Image Classification assessment.

20 Claims, 11 Drawing Sheets

Related U.S. Application Data

(60) Provisional application No. 62/553,011, filed on Aug. 31, 2017.

(51) Int. Cl.

| | |
|---|---|
| *G06F 16/583* | (2019.01) |
| *G06F 18/21* | (2023.01) |
| *G06F 18/24* | (2023.01) |
| *G06F 18/2413* | (2023.01) |
| *G06N 3/045* | (2023.01) |
| *G06V 30/19* | (2022.01) |
| *G06V 30/24* | (2022.01) |
| *G06V 10/82* | (2022.01) |
| *G06V 20/10* | (2022.01) |

(52) U.S. Cl.
CPC ............ *G06F 18/217* (2023.01); *G06F 18/24* (2023.01); *G06F 18/24143* (2023.01); *G06N 3/045* (2023.01); *G06V 10/82* (2022.01); *G06V 20/176* (2022.01); *G06V 30/19173* (2022.01); *G06V 30/2504* (2022.01)

(56) References Cited

U.S. PATENT DOCUMENTS

| | | | |
|---|---|---|---|
| 7,424,133 | B2 | 9/2008 | Schultz et al. |
| 8,095,434 | B1 | 1/2012 | Puttick et al. |
| 8,462,992 | B2 | 6/2013 | Chen et al. |
| 9,082,162 | B2 | 7/2015 | Gokturk et al. |
| 9,424,305 | B1 | 8/2016 | Puttick |
| 9,536,148 | B2 | 1/2017 | Gross |
| 9,805,261 | B1 | 10/2017 | Loveland et al. |
| 10,181,079 | B2 | 1/2019 | Labrie et al. |
| 10,977,490 | B1 | 4/2021 | Bokshi-Drotar et al. |
| 2007/0014488 | A1* | 1/2007 | Chen .................. G06T 7/33 382/294 |
| 2009/0067725 | A1 | 3/2009 | Sasakawa et al. |
| 2009/0103794 | A1 | 4/2009 | Sathyanarayana |
| 2011/0280453 | A1* | 11/2011 | Chen .................. G06T 7/75 382/113 |
| 2012/0323798 | A1 | 12/2012 | Den Herder et al. |
| 2013/0046746 | A1 | 2/2013 | Bennett |
| 2013/0155109 | A1 | 6/2013 | Schultz et al. |
| 2015/0213315 | A1 | 7/2015 | Gross |
| 2015/0227808 | A1 | 8/2015 | Zharkov |
| 2015/0347872 | A1 | 12/2015 | Taylor et al. |
| 2016/0005097 | A1 | 1/2016 | Hsiao et al. |
| 2016/0027051 | A1 | 1/2016 | Gross |
| 2016/0098589 | A1 | 4/2016 | Brieu |
| 2016/0196747 | A1 | 7/2016 | Tsyrklevich et al. |
| 2016/0217537 | A1 | 7/2016 | Childs |
| 2016/0239956 | A1 | 8/2016 | Kang et al. |
| 2016/0259994 | A1* | 9/2016 | Ravindran ............... G06N 3/08 |
| 2016/0371801 | A1 | 12/2016 | Dawson |
| 2017/0083762 | A1 | 3/2017 | Segalovitz et al. |
| 2017/0091627 | A1 | 3/2017 | Terrazas et al. |
| 2017/0249496 | A1 | 8/2017 | Fentzke et al. |
| 2017/0308549 | A1 | 10/2017 | Sims et al. |
| 2017/0358068 | A1* | 12/2017 | Strebel .................. G01S 17/89 |
| 2017/0371897 | A1 | 12/2017 | Strong et al. |
| 2018/0089531 | A1 | 3/2018 | Geva et al. |
| 2018/0089833 | A1 | 3/2018 | Lewis et al. |
| 2019/0155973 | A1 | 5/2019 | Morczinek et al. |
| 2019/0271550 | A1 | 9/2019 | Breed et al. |
| 2020/0019825 | A1 | 1/2020 | Frei et al. |
| 2020/0348132 | A1 | 11/2020 | Du et al. |
| 2021/0158609 | A1 | 5/2021 | Raskob et al. |

OTHER PUBLICATIONS

"OmniParcels for Insurance", PowerPoint Presentation, OmniEarth, Inc., Mar. 25, 2016.

"OmniParcels National Building Footprint Database", OmniEarth, Inc., 2017.

"OmniParcels/Yardographics/Water Resources", OmniEarth, Inc., retrieved from the internet: https://parceldemo.omniearth.net/#/map/, Feb. 2016.

"OmniParcels Delivers Current, Searchable Property Attributes with Regular Updates", via Internet Archive Wayback Machine [retrieved from the internet Jul. 25, 2017] retrieved from: https://web.archive.org/web/20160305114343/http://omniparcels.omniearth.net/, Mar. 5, 2016.

Goldberg et al., "Extracting geographic features from the Internet to automatically build detailed regional gazetteers," International Journal of Geographical Information Science, 23:1, 93-128, Jan. 2009.

Harris Geospatial Solutions, "Using ENVI and Geographic Information Systems (GIS)", Jan. 31, 2013.

Commonwealth of Massachusetts Executive Office of Environmental Affairs, "Parcel Mapping Using GIS a Guide to Digital Parcel Map Development for Massachusetts Local Governments", Aug. 1999.

European Court of Auditors, "The Land Parcel Identification System: a useful tool to determine the eligibility of agricultural land—but its management could be further improved" Luxembourg, 2016.

Nielsen, Michael A., "Neural Networks and Deep Learning", Determination Press, 2015, updated Jan. 19, 2017.

Simonyan et al., "Very Deep Convolutional Networks for Large-Scale Image Recognition", International Conference on Machine Learning, 2015.

Krizhevsky et al., "ImageNet Classification with Deep Convolutional Neural Networks", Advances in Neural Information Processing Systems 25, pp. 1097-1105, Curran Associates, Inc., 2012.

Long et al., "Fully Convolutional Networks for Semantic Segmentation", IEEE Conference on Computer Vision and Pattern Recognition, Jun. 2015.

Liu et al., "SSD: Single Shot MultiBox Detector", Computer Vision—ECCV 2016, Lecture Notes in Computer Science, vol. 9905, Dec. 2016.

Mountrakis et al., "Support vector machines in remote sensing: A review," ISPRS Journal of Photogrammetry and Remote Sensing vol. 66, Issue 3, May 2011, pp. 247-259.

PCT International Search Authority—U.S., International Search Report and Written Opinion regarding PCT/US18/48887, dated Nov. 20, 2018.

Galarreta et al., "UAV-based urban structural damage assessment using object-based image analysis and semantic reasoning," Natural Hazards and Earth System Sciences, Jun. 2015.

ESRI, Getting Started with ArcGIS, 2005, available at: <http://downloads.esri.com/support/documentation/ao_/1003Getting_Started_with_ArcGIS.pdf>, downloaded on Sep. 1, 2019 (Year: 2005).

Holt, Alec, "Spatial similarity and GIS: the grouping of spatial kinds," 1999, available at: < https://pdfs.semanticscholar.org/1ff7/49c905db58bb884a9d6609de9452edf7921b.pdf >, downloaded on Sep. 1, 2019 (Year: 1999).

Artificial Neural Networks Technology, [online], archived on Nov. 23, 2015, available at: <https://web.archIve.org/web/20151123211404/http://www2.psych.utoronto.ca/users/relngoid/course> (Year: 2015).

Marr, Bernard, "A Short History of Machine Learning—Every Manager Should Read," [online], Feb. 19, 2016, available at: < https://www .forbes.com/sltes/bernardmarr/2016/02/19/a-short-history-of-machine-learning-every-manager-should-read/#70f07e5415e7 > (Year: 2016).

European Patent Office, Extended European Search Report regarding European Patent App. No. 18852028.2, dated Apr. 22, 2021.

Cha, Young-Jin, et al., "Deep Learning-Based Crack Damage Detection Using Convolutional Neural Networks," Comput.-Aided Civ. Infrastruct. Eng., vol. 32, Issue 5, pp. 361-378, (retrieved from: https://doi.org/10.1111/mice.12263 last visited Jun. 10, 2021); 2017.

Duarte, Diogo, et al., "Satellite Image Classification of Building Damages Using Airborne and Satellite Image Samples in a Deep Learning Approach," ISPRS Ann. Photogramm. Remote Sens. Spatial Inf. Sci., vol. IV-2, pp. 89-96, (retrieved from: https://doi.org/10.5194/isprs-annals-IV-2-89-2018, last visited Jun. 10, 2021); 2018.

(56) References Cited

OTHER PUBLICATIONS

USPTO, Advisory Action regarding U.S. Appl. No. 15/634,879, dated Jan. 19, 2022.
Omniearth, Inc., Response dated Jan. 19, 2022 Advisory Action dated Sep. 14, 2021 Office Action regarding U.S. Appl. No. 15/634,879, filed Feb. 14, 2022.
IP Australia, Examination Report No. 1 regarding Australian Patent Application No. 2018324087, dated Jan. 24, 2022.
USPTO, Notice of Allowance for U.S. Appl. No. 15/634,879, dated Mar. 17, 2022.
Intellectual Property India, First Examination Report regarding Indian Patent Application No. 201917051463, dated Mar. 11, 2022.
Omniearth, Inc., Response dated Apr. 22, 2021 Extended European Search Report regarding European Patent Application No. EP18852028.2, dated Feb. 15, 2022.
Galarreta, Jorge Fernandez; "Urban Structural Damage Assessment Using Object-Oriented Analysis and Semantic Reasoning," Thesis submitted to the Faculty of Geo-Information Science and Earth Observation of the University of Twente; Enschede, The Netherlands, Apr. 2014.
Kang et al., "Building Instance Classification Using Street View Images," ISPRS Journal of Photogrammetry and Remote Sensing, 145, 44-59, Elsevier, Mar. 2018.

\* cited by examiner

SYSTEMS AND METHODS FOR AUTOMATIC ESTIMATION OF OBJECT CHARACTERISTICS FROM DIGITAL IMAGES

CROSS-REFERENCE TO RELATED APPLICATIONS

The present application claims priority from U.S. patent application Ser. No. 16/118,021, filed Aug. 30, 2018, which claims the benefit of U.S. Provisional Application No. 62/553,011, filed on Aug. 31, 2017, the entire disclosures of each of which are hereby incorporated herein by reference.

BACKGROUND

The assessment of characteristics of large objects, such as buildings, infrastructure, utility towers, roads, bridges, pipelines, and other objects, often requires a person be sent to the site of the object to inspect the object. This can be a time consuming and expensive process. However, current automated processes for the determination of characteristics of objects from digital images in the field of remote sensing also may have drawbacks.

Digital images can be described as pixelated, 3-dimensional arrays of electronic signals. The three dimensions of such an array consist of spatial (x, y or latitude, longitude) and spectral (e.g. red, green, blue) elements. Each pixel in the image captures wavelengths of light incident on it, limited by the spectral bandpass of the system. The wavelengths of light are converted into digital signals readable by a computer as float or integer values. How much signal exists per pixel depends, for example, on the lighting conditions (light reflection or scattering), what is being imaged, and even the imaged object's chemical properties.

The electronic signals per pixel can be evaluated individually or aggregated into clusters of surrounding pixels. A high resolution camera, with many individual pixels over a small area, can resolve objects in high detail (which varies with distance to the object and object type). A comparable system with fewer pixels, projected over an equivalent area, will resolve far less detail, as the resolvable information is limited by the per pixel area.

For machine learning (ML) with digital imagery, the goal is to train a computer system to deconstruct digital images into clusters of aggregated pixels and statistically identify correlations in the clusters. The correlations are iteratively evaluated and "learned" from by the computer system, based on a directive to classify a set of patterns as a specific thing. For example, the directive could be to classify the set of patterns to distinguish between a cat and dog, identify all the cars, find the damage on the roof of the building in the clusters, and so on.

Over many imaged objects, regardless of color, orientation, or size of the object in the digital image, these specific patterns for the object are mostly consistent—in effect they describe the fundamental structure of the object of interest. For an example in which the object is a cat, the computer system comes to recognize a cat in an image because the system understands the variation in species, color, size, and orientation of cats after seeing many images or instances of cats. The learned statistical correlations are then applied to new data to extract the relevant objects of interest or information.

Convolutional neural networks (CNN) are machine learning models that have been used to perform this function through the interconnection of equations that aggregate the pixel digital numbers using specific combinations of connecting the equations and clustering the pixels, in order to statistically identify objects (or "classes") in a digital image. Exemplary uses of Convolutional Neural Networks are explained, for example, in "ImageNet Classification with Deep Convolutional Neural Networks," by Krizhevsky et al. (Advances in Neural Information Processing Systems 25, pages 1097-1105, 2012); and in "Fully Convolutional Networks for Semantic Segmentation," by Long et al. (IEEE Conference on Computer Vision and Pattern Recognition, June 2015); both of which are hereby incorporated by reference in their entirety herein.

When using computer-based supervised deep learning techniques, such as with a CNN, for digital images, a user provides a series of examples of digital images of the objects of interest to the computer and the computer system uses a network of equations to "learn" significant correlations for the object of interest via statistical iterations of pixel clustering, filtering, and convolving.

In the technological field of remote sensing, digital images may be used for mapping geospatial information. Classifying pixels in an image for geospatial information purposes has been done through various techniques. For example, some CNN-based techniques include Semantic Segmentation (also known as pixel-wise classification or individual pixel mapping) using fully convolutional neural networks (FCN) as described in "Fully Convolutional Networks for Semantic Segmentation," by Long et al., referenced above. In this technique, each pixel in the image is given a label or classification based on training data examples, as discussed in the general overview above. However, the technique is computationally intensive, as it requires resources of computational space, time, and money to assess each individual pixel.

A technique that exists outside of the technological field of geospatial mapping is General Image Classification using a convolutional neural network (CNN), such as that described by Simonyan et al. in the article "Very Deep Convolutional Networks for Large-Scale Image Recognition" (International Conference on Machine Learning, 2015), which is hereby incorporated by reference in its entirety herein. In General Image Classification, rather than individual pixels being labeled, an entire image is given a generalized label. This is typically a much simpler algorithm than the FCN Semantic Segmentation, and so may require less computation. However, this method provides less information about an image, as it is limited to the image as an aggregated whole as a generalization rather than identifying particulars, such as where objects in the scene are located within the digital image or where particular information is located within the digital image.

What is needed is an automated method and system to determine characteristics of objects depicted in digital images in which the process is not as computationally expensive as FCN Semantic Segmentation (pixel-wise classification) but is more accurate and provides more information about parts of a digital image than General Image Classification.

SUMMARY

The problem of automating the assessment of characteristics of an object is solved with the methods and systems described herein, including an object characteristic estimation method comprising sub-dividing one or more digital image depicting one or more object of interest into segments; assessing, automatically, the contents depicted in one or more of the segments using General Image Classification; and determining, automatically, the level of confidence that the one or more of the segments have one or more predetermined characteristics, such as one of a plurality of predetermined characteristics each having different extent and/or severity of the characteristic of type of characteristic. The methods and systems may further comprise displaying the results of the segment classification as having one or more predetermined characteristics and/or indicating a type of predetermined characteristics having a particular extent and/or severity and/or with a level of confidence (such as a confidence score) as to the statistical likelihood that the characteristic is present or not present.

The method produces a generalized label for a subset of a larger digital image, which produces a result closer to that of a fully convolutional neural network (FCN) with more information as to portions of the image, but in actuality uses a basic General Image Classifier on segments of the image. The full image is subdivided into components where one or more individual component is treated as an independent image classification problem. The predicted results may then be spatially re-joined after processing to generate a map of predictions with confidence scores indicative of how statistically likely the prediction is true. This reduces computational overhead and expedites the production of a consistent spatial mapping of localized knowledge (for example, abnormalities such as damage) for the digital image.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
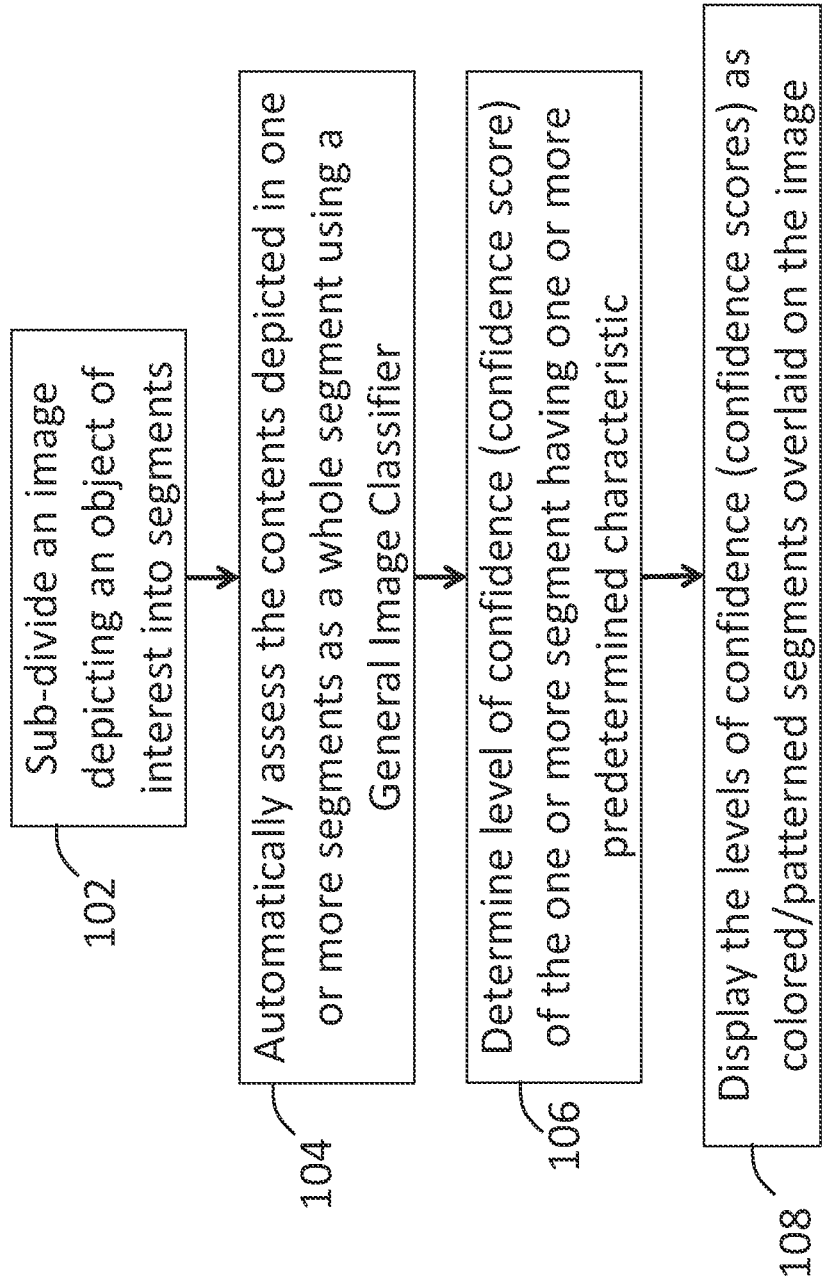
FIG. 1 is a process flow diagram of an exemplary embodiment of an object characteristic estimation method in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, although damage to residential structures may be used as an example, the methods and systems may be used to automatically assess other characteristics (for example, but not limited to, types, features, abnormalities, or conditions) of other man-made objects, non-exclusive examples of which include commercial buildings and infrastructure including roads, bridges, utility lines, pipelines, utility towers. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

Referring now to the drawings, FIG. 1 is a process flow chart depicting one embodiment of an object characteristic estimation method 10 for identifying, quantifying, and/or determining the positive detection of one or more characteristic of an object of interest 14 depicted within a digital image 12.

Generally, the object characteristic estimation method 10 comprises sub-dividing one or more digital image 12 depicting one or more object of interest 14 into segments 16 (step 102), automatically assessing the contents depicted in one or more of the segments 16 (step 104) at a segment level using a General Image Classifier in which each segment 16 is treated as an independent image classification problem, and automatically determining the level of confidence (such as by determining a confidence score) that the one or more of the segments 16 has one or more predetermined object characteristic (step 106). In one embodiment, the object characteristic estimation method 10 may further comprise displaying the levels of confidence per object characteristic type as colored, patterned, semi-transparent, and/or transparent segments 16 overlaid on the image 12 (step 108) with the segments 16, aligned with the area of the object having that object characteristic. For purposes of this disclosure, the term "level of confidence" may mean the statistical likelihood that a condition is true and the term "confidence score" may be a numerical value indicative of the level of confidence. In one embodiment, the predicted results may be spatially re-joined after processing to generate a display of confidence scores.

The object characteristic estimation method 10 may produce a generalized label across an individual segment 16 of the larger image 12 using a basic General Image Classifier on a segment level. The object characteristic estimation method 10 uses simpler algorithms in the General Image Classifiers than a fully convolutional neural network (FCN) semantic segmentation of the digital image 12 (which requires every pixel of the digital image 12 to be analyzed).

One non-exclusive example of an object characteristic is a type and/or severity of damage to the object of interest 14. For exemplary purposes, the object characteristic will generally be described herein as damage. However, it will be understood that object characteristics may be any characteristic, including but not limited to damage, condition, wear, components, features, and form, and/or may include the negative state (that is, that the object characteristic is not present).

Additionally, the object characteristics may include variations that encompass different levels of the extent or severity of the characteristic. For instance, a first example of an object characteristic may be hail damage with a ninety percent level of severity on a predetermined scale of severity, a second example of an object characteristic may be hail damage with an eighty percent level of severity on a predetermined scale of severity, a third example of an object characteristic may be hail damage with a seventy percent level of severity on a predetermined scale of severity another example, a fourth example of an object characteristic may be hail damage with a sixty percent level of severity on a predetermined scale of severity, and so on.

Figure 2:
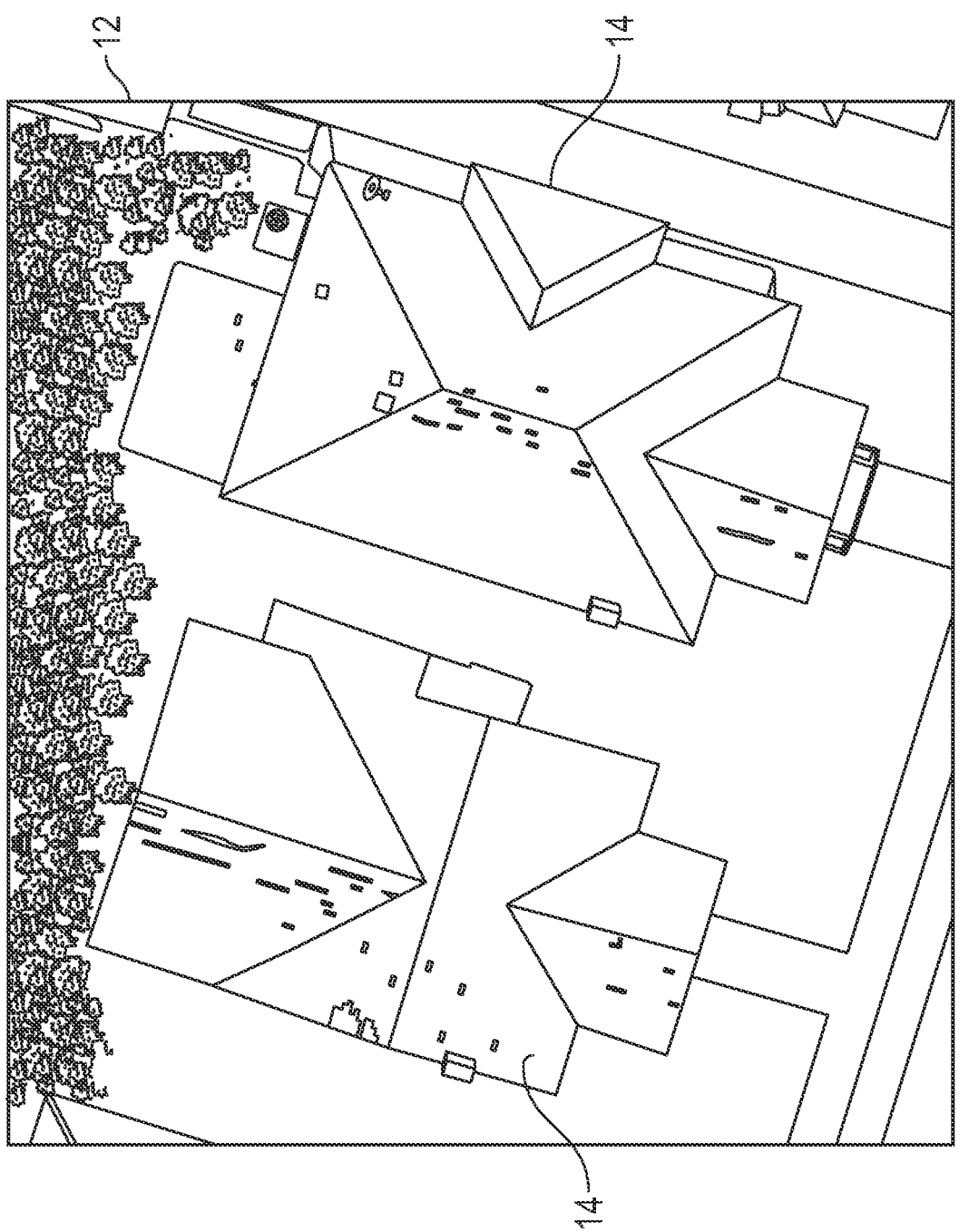
FIG. 2 is an exemplary nadir image depicting objects of interest.
Figure 3:
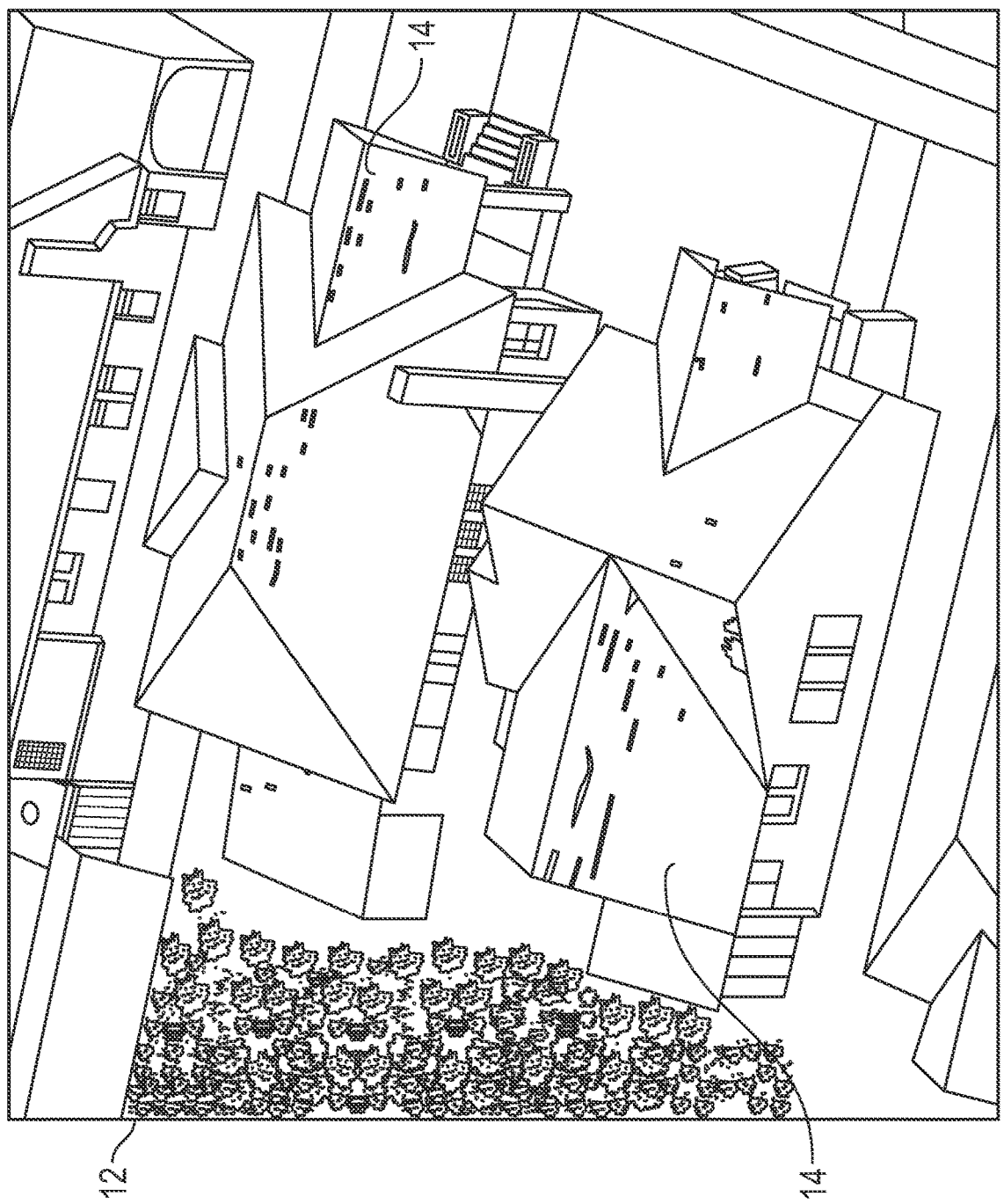
FIG. 3 is an exemplary oblique image depicting objects of interest.

As depicted in FIGS. 2 and 3, in one embodiment, the one or more digital image 12 may be one or more picture taken of a geographic area with a sensor, such as a camera, from an overhead viewpoint, also referred to as a nadir view, typically taken directly below and/or vertically downward from the camera lens positioned above the object of interest 14 (FIG. 2), and/or the one or more digital image 12 may be one or more picture taken of the geographic area with a sensor, such as a camera, from an oblique viewpoint, which is an angle that is not vertically downward from a camera lens above the object of interest 14 (FIG. 3). In the example depicted in FIGS. 2 and 3, the objects of interest 14 are two residential structures.

In one embodiment, the one or more image 12 may be high-resolution images 12, such that details depicted in the image 12 are sharp and well defined. In one embodiment, the term high-resolution in conjunction with digital image 12 may mean the digital image 12 may have a high number of pixels per inch (for example, greater than ten pixels per inch).

In one embodiment, the one or more image 12 may be captured recently, for example, within one day, two days, one week, or one month of the image analysis. In one embodiment, the one or more image 12 may have been captured within the preceding ninety days before the image 12 is segmented. This ensures that the object characteristic estimation method 10 assesses current damage to the object of interest 14.

In one embodiment, the sensor can be oriented and located in various orientations and locations, such as street view, satellite, automotive based, unmanned aerial vehicle based, and/or manned aerial vehicle based. The image data may contain nominal "visible-band" (red, green, blue) wavelength spectral data or other spectral bands data (for example, infrared wavelength spectral data).

In one embodiment, the images 12 may be geo-referenced, that is, processed such that pixels in the image 12 have a determined geo-location, such as x, y, and z coordinates and/or latitude, longitude, and elevation coordinates. See, for example, U.S. Pat. No. 7,424,133 that describes techniques for geolocating oblique images and measuring within the oblique images. The entire content of U.S. Pat. No. 7,424,133 is hereby incorporated herein by reference. Also, see U.S. Publication No. 2015/0347872 describing object detection from aerial images using disparity mapping and segmentation techniques. Techniques known in the art as "bundle adjustment" can also be used to create and/or enhance the geolocation data. The geo-location data can be stored as metadata within the images, or stored separately from the images and related to the images using any suitable technique, such as unique identifiers.

In one embodiment, the step 102 of sub-dividing the one or more image 12 depicting one or more object of interest 14 into segments 16 may comprise dividing the image 12 into a plurality of segments 16. The segments 16 comprise two or more pixels.

The segments 16 may comprise a number of pixels greater than one that allows for optimization of computing overhead. For example, the image 12 may be divided into a small number of segments 16 (that is, segments 16 having larger dimensions) each having a greater number of pixels to reduce the amount of computing resources needed for the object characteristic estimation method 10. In other situations where more computing resources are used, the segments 16 may comprise a larger number of segments 16 (that is, segments 16 having smaller dimensions), each having a smaller number of pixels (though greater than one pixel).

Figure 4:
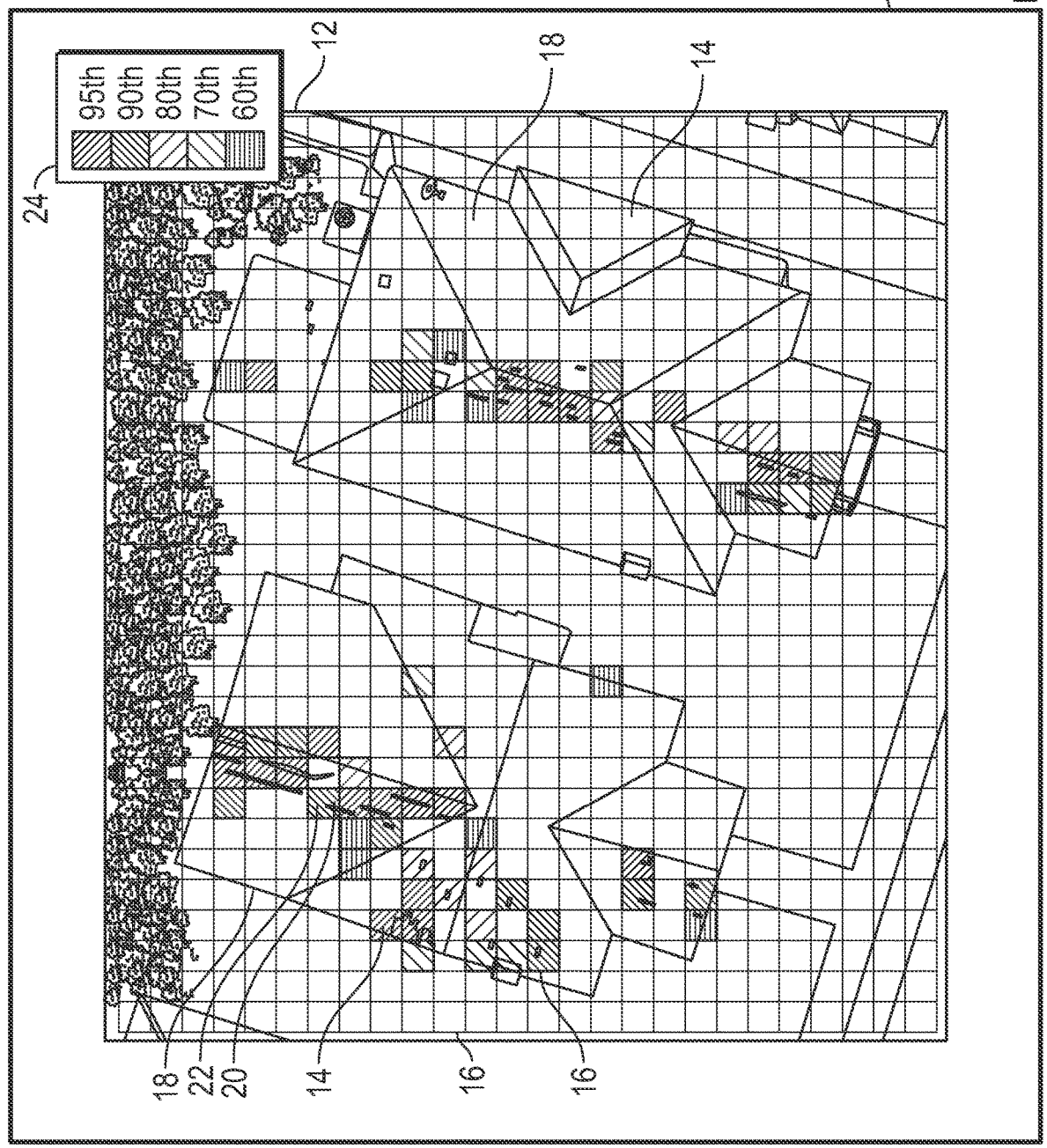
FIG. 4 is an exemplary display in accordance with the present disclosure.
Figure 5:
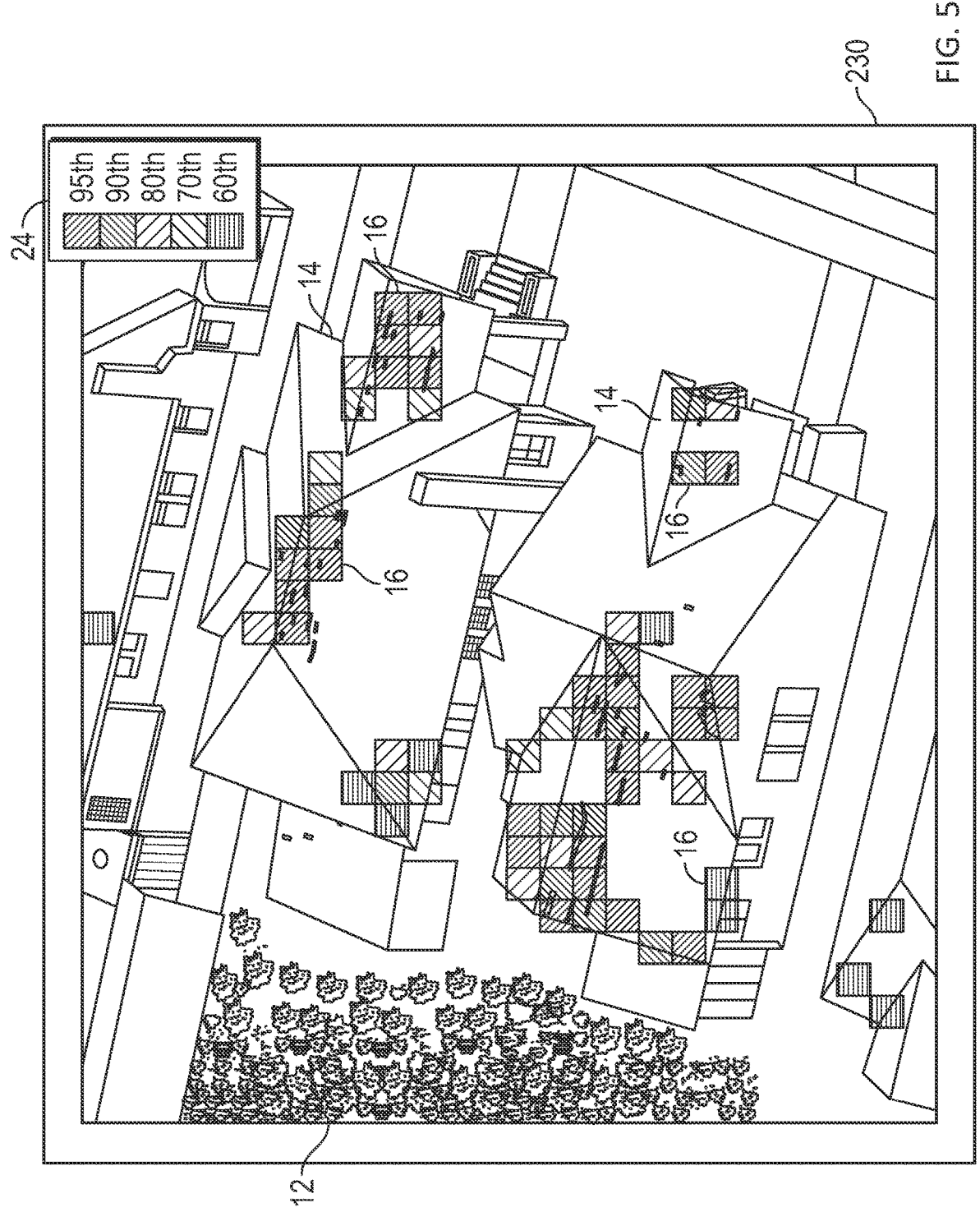
FIG. 5 is another exemplary display in accordance with the present disclosure.

In one embodiment, the segments 16 of a particular image 12 are all of the same size. In one non-limiting example, the image 12 may be divided into a plurality of segments 16 that each has approximately ten pixels. In one embodiment, the segments 16 of a particular image 12 are of different sizes. In one embodiment, as shown in FIGS. 4 and 5, the segments 16 may be rectangular or square shaped, such as formed by a grid. In another embodiment, the segments 16 may be other polygonal shapes. However, it will be understood that the segments 16 may be of any shape and size or combination of shapes and sizes.

The step 102 of sub-dividing the one or more image 12 into segments 16 may be manual, automated, or a combination of manual and automated. In one embodiment, the step 102 of sub-dividing the one or more image 12 into segments 16 may further comprise determining the size of the segments 16. The step 102 of determining the size of the segments 16 may be manual, automated, or a combination of manual and automated.

In one embodiment, the size of the segments 16 is based at least in part on requirements of machine-learning or other algorithmic processing as part of the assessment of the contents depicted in the segments 16. In one embodiment, the size of the segments 16 may be based on the type of object characteristic to be identified. The type of object characteristic may be predetermined. In one embodiment, the size of the segments 16 may be determined such that one or more segments 16 depict the context of the object characteristic. For example, in an assessment of hail damage to a roof 18, the segments 16 may be sized such that a particular segment 16 may encompass both a damaged section 20 of the roof 18 and a portion of an undamaged section 22 of the roof 18 in the digital image 12, such that the damage is depicted in context (that is, as compared to the undamaged section 22 portion).

In one embodiment, the size of the segments 16 may be greater than, and at least partially based on, the type of characteristic being assessed. As another example, in an assessment of hail damage to the roof 18, to detect a small hail mark on a large roof 18, the size of the segments 16 is relatively small (that is, contains a relatively small number of pixels) to help localize the object of interest. Aggregating too many pixels in one segment 16 may obscure the location or extent of the hail damage in relation to the roof 18, since the result of the assessment of such a segment 16 may be that that whole segment 16 contains hail damage.

In one embodiment, the size of the segments 16 is determined based at least in part on the resolution of an image 12. For example, higher resolution images 12 may be divided into larger segments 16 (that is, segments 16 containing more pixels), because there is more information or signal per pixel when the pixels have a higher resolution ("small" pixels) than when the pixels have a lower resolution. As an example, each pixel can be visualized like looking down the end of a drinking straw. A high resolution image 12 is like a bundle of small diameter straws, so more are aggregated in order to understand what each segment 16 represents. If the image 12 is lower resolution it is like a bundle of fatter drinking straws, and fewer are aggregated to represent object(s) in each segment 16, so the segments 16 can be smaller (that is, contain fewer pixels, though still more than one pixel per segment 16).

In one embodiment, the step 104 of automatically assessing the contents depicted in the one or more of the segments 16 comprises assessing the pixels of the segment 16 as a whole with a machine learning classifier and/or artificial intelligence and/or other algorithm(s) for imagery-based analysis, such as a neural net image classification system. As previously discussed, the digital images 12 may be described as pixelated numbers in a three-dimensional (3D) array 40. The array 40 may comprise spatial (x, y or latitude, longitude) and spectral (e.g. red, green, blue) elements. The electronic signal captured per pixel, and converted into a float or integer array of numbers read by a computer, may be aggregated over a group of pixels and combined in any spatial or spectral dimension.

For machine learning purposes, characteristics of the object of interest 14 in an image 12, requiring classification or labelling, may be pre-defined as training examples, where a human has initially defined what set of images 12 best represent the characteristics of the object of interest 14. These images are ingested into the General Image Classifier CNN and statistical iterations, and through clustering the pixel data, result in establishing correlations, that are associated with the pre-defined characteristics of the object of interest 14.

Figure 6A:
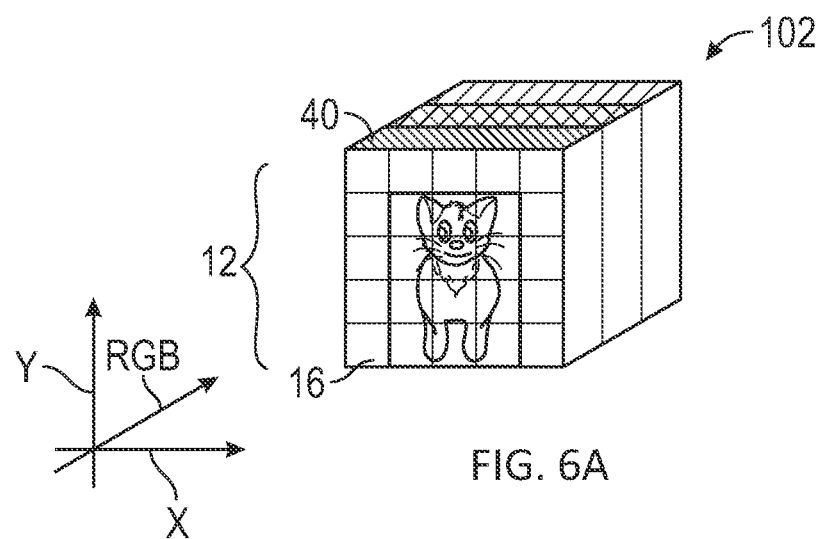
FIG. 6A is an illustration of an exemplary digital image array.

FIG. 6A illustrates one example of a digital image 12 as an exemplary three-dimensional array 40. In this example, the digital image 12, depicting a cat somewhere within the image 12, and the array 40, is divided into segments 16 in step 102 of the object characteristic estimation method 10. If the digital image 12 has a high resolution with many pixels, the array 40 may be divided into fewer, larger segments 16, such as the grid shown in FIG. 6A. In this example, the large segments 16 each encompass many pixels per segment 16, which provides more information per segment 16.

Figure 6B:
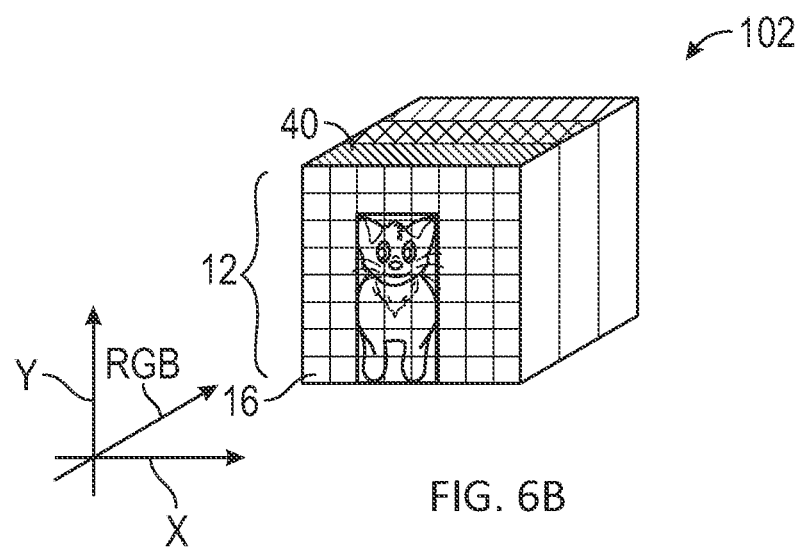
FIG. 6B is an illustration of another exemplary digital image array.

If the digital image 12 has a low resolution, such as in FIG. 6B, fine resolution mapping may be used such that the array 40 for the digital image 12 may be divided into more, smaller segments 16 having fewer pixels (though still more than one pixel) than the high-resolution example of FIG. 6A. In the example of FIG. 6B, there is less information per segment 16, but that information is more likely to better represent the object of interest 14, that is, the cat, in the particular segment 16.

Figure 6C:
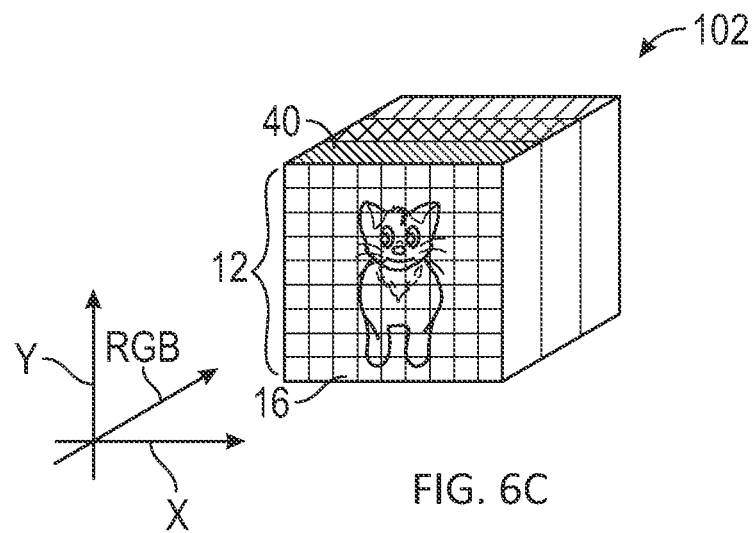
FIG. 6C is an illustration of yet another exemplary digital image array.

In one embodiment, as illustrated in FIG. 6C, the digital image 12 and the array 40 may be segmented so as the segments 16 may be assessed and labelled based on not just confidence of a single label (e.g., "cat") but labelled at a more granular level (e.g., "paws", "ears", "whiskers") with corresponding levels of confidence.

In one embodiment, the number of segments 16 may be determined using the following formula:

$$\text{Number of segments} = Fnc(Ixy, r, O)$$

where "Ixy" is the size [x, y] of the image array 40; where "O" is the object type and fraction of image size; and where "r" is the pixel resolution.

In one embodiment, the step 104 of automatically assessing the contents depicted in the one or more of the segments 16 comprises assessing the contents depicted in one or more of the segments 16 using machine learning techniques comprising General Image Classification (also known as deep learning image classification) of the one or more of the segments 16 using a convolutional neural network (CNN).

Convolutional neural networks (CNN) are deep learning (machine learning) models that may be used to perform General Image Classification functions through the interconnection of equations that aggregate the pixel numbers using specific combinations of connecting the equations and clustering pixels. The learned patterns are then applied to new images 12 to assess whether the learned features of the objects of interest 14 are present or not in the new images 12.

General Image Classification may comprise analyzing one or more segment 16 as a whole and outputting a general classification for the one or more segment 16 as a whole, rather than for each pixel of the segment 16. General Image Classification may be applied to analyze the segment 16 as a unit, rather than analyzing each individual pixel of the segment 16. The analyzation of the segment 16 as a whole provides a result for the segment 16 as a whole. The result of the analysis of the segment 16 may be a level of confidence (step 106 of the object characteristic estimation method 10) that the segment 16 represents a particular predetermined object characteristic (for example, condition, feature, abnormality, lack of an object, lack of an abnormality, and so on).

Analyzing the segment 16 as a whole requires less computational time and/or fewer computational resources than analyzing each pixel in a segment 16 of the image 12 or in the entire image 12. Additionally, analyzing the segment 16 rather than the entire image 12 produces a more accurate and finer result that includes results for each segment 16, rather than a single coarse result for the whole image 12. The more accurate and finer result may be a level of confidence for each of one or more individual segment 16 that the condition is, or is not, within a particular segment 16, rather than a single level of confidence for the entire image 12.

In one embodiment, assessing the segment 16 with the General Image Classification convolutional neural network may comprise creating a classifier or model predictive of the type, severity, and/or extent of damage to the object of interest 14 based on previously reviewed examples of objects with damage of varying type, severity, and/or extent. The machine learning algorithms, which may include neural networks or artificial intelligences, develop correlations based on image spectral information, texture information, and other contextual details through the supply of representative data (for example, example images of damaged objects). These correlations may be stored as a model that may then be applied to individual segments 16 of the digital images 12.

In one embodiment, algorithms comprising a neural network are utilized to determine patterns within one or more of the segments 16 of the image 12 of the object(s) of interest 14, and the predictive model is constructed therefrom. The object characteristic estimation method 10 may establish correlations across spectral, spatial, and contextual space for the segment 16 of the image 12 of the object of interest 14. A set of representative data that contains the objects with the predetermined object characteristic can be identified and submitted to the machine learning classification as "training" material. Training entails a statistical method to iterate the application of the correlations or model, "learned" from the training data to the test data set. The accuracy of the prediction based on the known labels can be provided per iteration until a desired accuracy is achieved (nominally, >85%, but adjustable, for example, depending on the information provided or the desired accuracy of the user) or timeframe is met. The final model post-iteration may then be applied to a broader, unlabeled or unconstrained, region.

In one embodiment, deep learning convolutional neural networks classify digital images of objects having predetermined characteristic(s) to construct the predictive model. Non-exclusive examples of a predictive model include a Support Vector Machine (svm) or k-means model, such as those described in the article "Support vector machines in remote sensing: A review," (Mountrakis et al., ISPRS Journal of Photogrammetry and Remote Sensing Volume 66, Issue 3, May 2011, pages 247-259), which is hereby incorporated in its entirety herein.

The artificial intelligence/neural network output is a similar type model, but with greater adaptability to both identify context and respond to changes in imagery parameters. It is typically a binary output, formatted and dictated by the language/format of the network used, that may then be implemented in a separate workflow and applied for predictive classification to the broader area of interest.

The step 106 of automatically determining the level of confidence that the one or more of the segments 16 having one or more predetermined object characteristic is based on the assessment of the contents depicted in the one or more of the segments 16, such as with the machine learning classifier using General Image Classification. The machine learning classifier (or other model) may output the probability that a particular segment 16 has a characteristic and/or at what level the particular segment 16 has the characteristic. The basic convolutional neural network has been trained with information to classify the predetermined characteristics of the object. For example, the step 106 may classify one or more of the segments 16 including a scale of extent and/or severity. For example, when assessing a segment 16 of an image 12 of the roof 18 having wind damage, the model may determine there is a 95% level of confidence that the segment 16 has wind damage and that the damage is at an 80% level on a scale of damage severity/extent. As another non-exclusive example, the model may determine there is an 85% level of confidence that the segment 16 has wind damage at a 60% level on a scale of damage severity/extent.

FIGS. 4 and 5 illustrate one example in which the segments 16 are classified on a scale of wind damage extent and/or severity. In this example, one or more of the segments 16 are aggregated and overlaid in a display of the image 12 with a color to indicate the extent and/or severity of the wind damage (in step 108 of the object characteristic estimation method 10).

The object characteristic estimation method 10 may limit the display of color on the segments 16 to only those segments 16 which meet a pre-determined minimum level of confidence that the damage classification is accurate. In one example, the pre-determined minimum level of confidence may be 85%; however, the predetermined minimum level may be chosen based on a desired level of certainty of the user. Additionally, the object characteristic estimation method 10 may limit the display of color on the segments 16 to only those segments 16 which meet a pre-determined level of damage extent and/or severity. In the example of FIGS. 4 and 5, the pre-determined level of damage extent and severity is shown starting at a sixtieth percentile damage extent and severity on a predetermined scale.

As illustrated in FIG. 4, in one embodiment, displaying the severity and/or extent of damage as colored, patterned, semi-transparent, and/or transparent segments 16 combined and overlaid on the image 12 (step 108) may be shown with the segments 16 outlined on the image 12. In one embodiment, displaying the severity and/or extent as colored, semi-transparent, and/or transparent segments 16 overlaid on the image 12 may be shown without the outlines of the segments 16, that is, with just the color overlays, as illustrated in FIG. 5. In one embodiment, the colors of the segments 16 may differ based on the level of confidence that the segment 16 depicts damage and/or the severity and/or extent of the damage. In one embodiment, the colors of the segments 16 may be progressively "warmer" (that is, into the red spectrum) based on the level of the severity and/or extent of the damage and/or the level of confidence in the prediction of the presence of the object characteristic. The colors of the segments 16 may resemble a "heat map" with the colors closest to red representing the most damage (and/or the highest confidence level) and the colors closest to blue or transparent representing the least or no damage (and/or the lowest confidence level). In one embodiment, the colors of the segments 16 may differ based on the severity of the damage. In one embodiment, variations of gray or variations of cross-hatching may be used in place of colors to indicate the damage extent and/or severity.

In one embodiment, as shown in FIGS. 4 and 5, a legend 24 may be displayed indicating the relationship between the colors overlaid on the image and the damage extent and/or severity. The legend 24 may be indicative of the level of confidence and/or ranges of the object characteristic, such as ranges of damage extent and/or severity.

In one embodiment, the object characteristic estimation method 10 may be a gridded, coarse image segmentation method for displaying information on the image 12 in heatmap-like format. The method may subdivide a larger image 12 of an object of interest 14 (including, but not limited to, a roof or property) in a regularly gridded set of segments 16 that may scale with both the resolution of the image 12 and/or be based on the needs of machine-learning or other algorithmic processing. The segments 16 may be connected back together to form the original image 12. In one embodiment, each individual segment 16 within the grid may be fed into a machine learning classifier or other algorithm for imagery-based analysis (e.g. neural net image classification) of the segment 16. The output per segment 16 may be an index or level of confidence that the segment 16 having a certain characteristic (for example, probability damage or detection of recent construction/change). Post-processing, the individual segments 16 may be colorized and/or patterned based on percentile bins of output classification levels of confidence (which may be represented as numerical confidence scores) and recombined in the shape of the original, non-gridded image (FIG. 5).

Figure 6D:
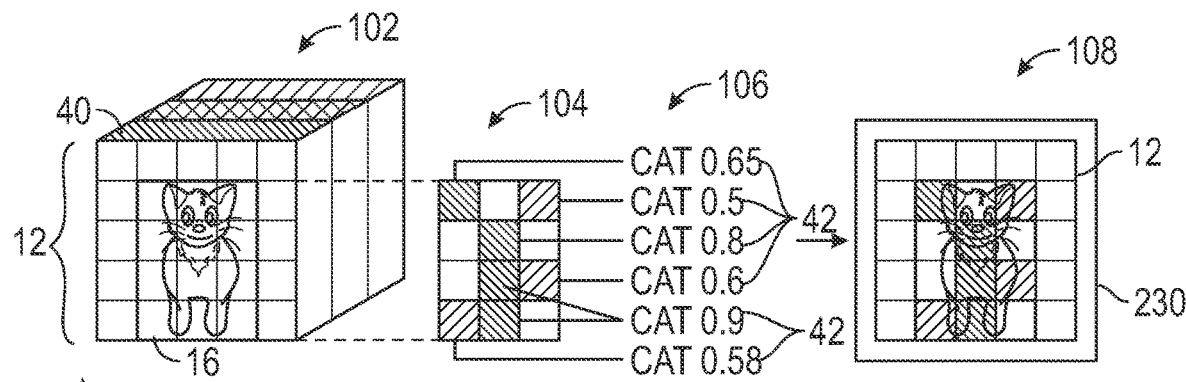
FIG. 6D is an illustration of an exemplary embodiment of an object characteristic estimation method in accordance with the present disclosure.
Figure 6E:
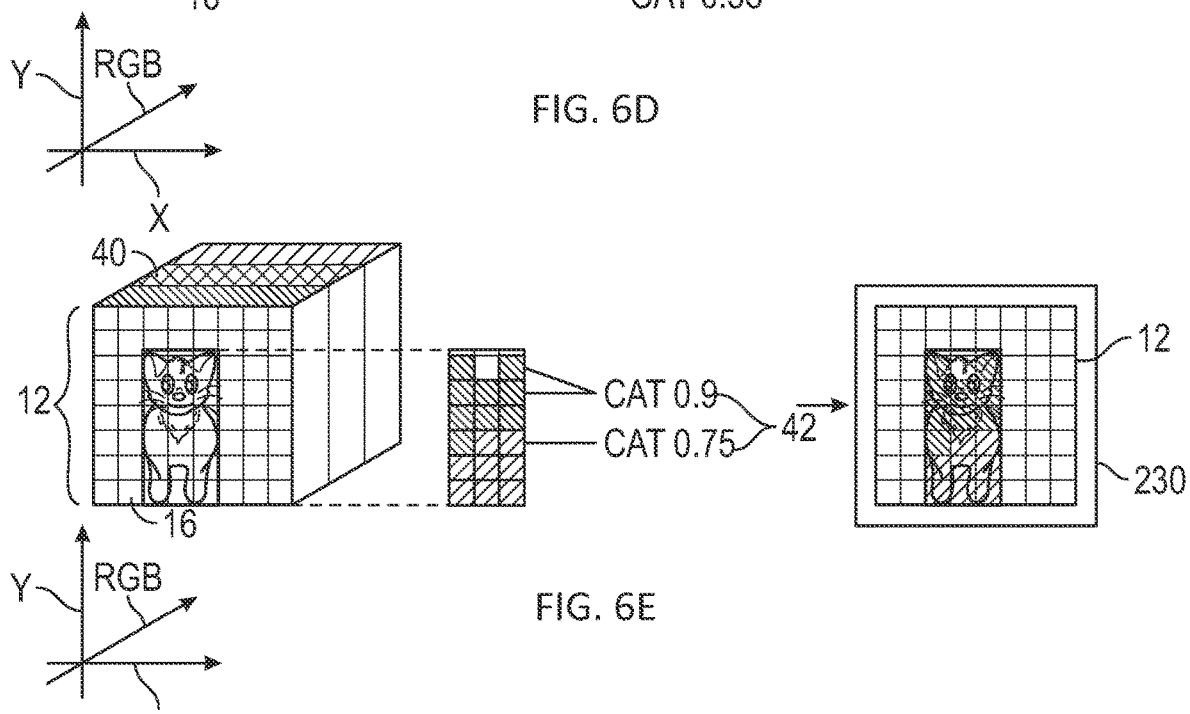
FIG. 6E is an illustration of an exemplary embodiment of an object characteristic estimation method in accordance with the present disclosure.
Figure 6F:
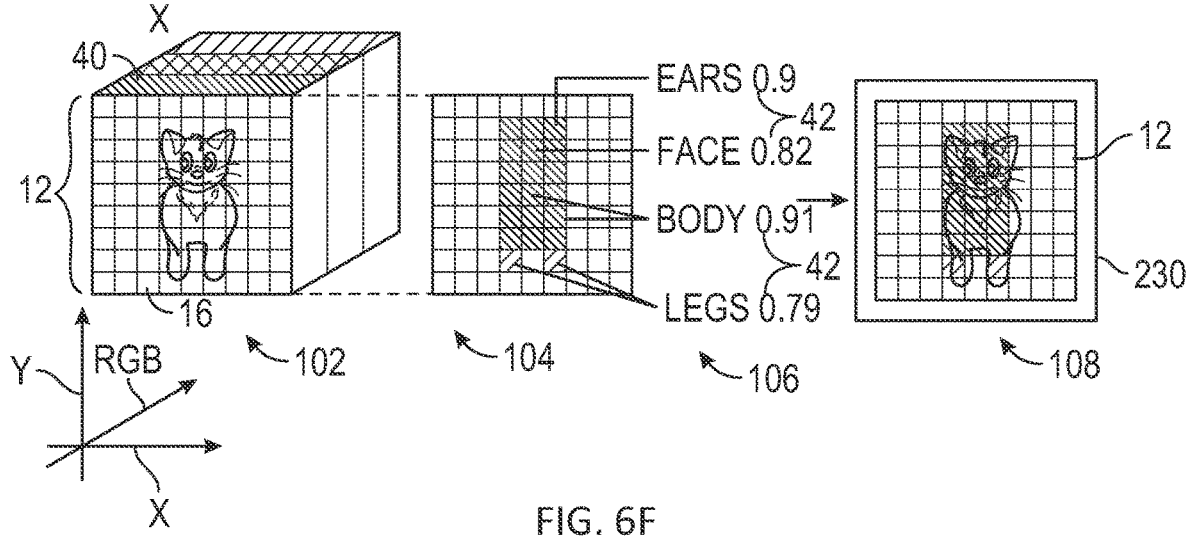
FIG. 6F is an illustration of an exemplary embodiment of an object characteristic estimation method in accordance with the present disclosure.

Referring to FIG. 6D-6F, other examples of the object characteristic estimation method 10 in use are illustrated. FIG. 6D illustrates one example of a digital image 12 as an exemplary three-dimensional array 40. In this example, the digital image 12, depicting a cat somewhere within the image 12, is divided into segments 16 (step 102 of the object characteristic estimation method 10). As previously discussed, since the digital image 12 has a high resolution with many pixels, the array may be divided into fewer, larger segments 16, such as the grid shown in FIG. 6A. Here, each segment 16 in the image 12 goes through a coarse mapping using General Image Classification to determine the likelihood that the object of interest 14 (a cat) is depicted in a particular segment (step 104) and a confidence score 42 for the particular segment 16 in the image 12, that is, the probability that the object of interest 14 (here, the cat) is depicted in the particular segment 16 (step 106). It will be understood that the confidence scores 42 shown in FIG. 6A are simply for illustrative purposes and, in the interests of clarity, not all confidence scores are shown. The confidence scores 42 may be displayed as colored and/or patterned overlays on the segments 16 over the digital image 12 (step 108).

If the digital image 12 has a low resolution, such as in FIG. 6E, fine resolution mapping may be used such that the array 40 may be divided into more, smaller segments 16 (step 102) than the high-resolution example of FIG. 6D. General Image Classification is used to assess the segment 16 (step 104) to produce a confidence score 42 for each segment 16 of interest (step 106), that is, the probability that the object of interest 14 (here, the cat) is depicted in the particular segment 16. It will be understood that the confidence scores 42 shown in FIG. 6E are simply for illustrative purposes and, in the interests of clarity, not all confidence scores are shown. The confidence scores 42 may be displayed as colored and/or patterned overlays on the segments 16 over the digital image 12 (step 108).

In one embodiment, as illustrated in FIG. 6F, the array 40 may be analyzed using a multi-class or multi-object mapping approach, in which the segments 16 are analyzed for different sub-parts of the object of interest 14 (the cat). For example, the segment 16 may be analyzed using General Image Classification to determine if a segment 16 depicts the ears of the cat, the face of the cat, the body of the cat, the legs of the cat, and so on. General Image Classification is used to assess the segment 16 (step 104) and produce a confidence score 42 for each segment 16 of interest, that is, the probability that the object of interest 14 (here, the part of the cat) is depicted in the particular segment 16 (step 106). It will be understood that the confidence scores 42 shown in FIG. 6F are simply for illustrative purposes and, in the interests of clarity, not all confidence scores are shown. The confidence scores 42 may be displayed as colored and/or patterned overlays on the segments 16 over the digital image 12 (step 108).

The object characteristic estimation method 10 is a quick diagnostic of imagery-derived information ideal for processing with machine learning techniques. The coarse segmentation approach requires less computational overhead than a full Semantic Segmentation or pixel classification approach. The segmented structure lends itself to a heatmap display that facilities information take-away by the end-user of the image 12.

Figure 7:
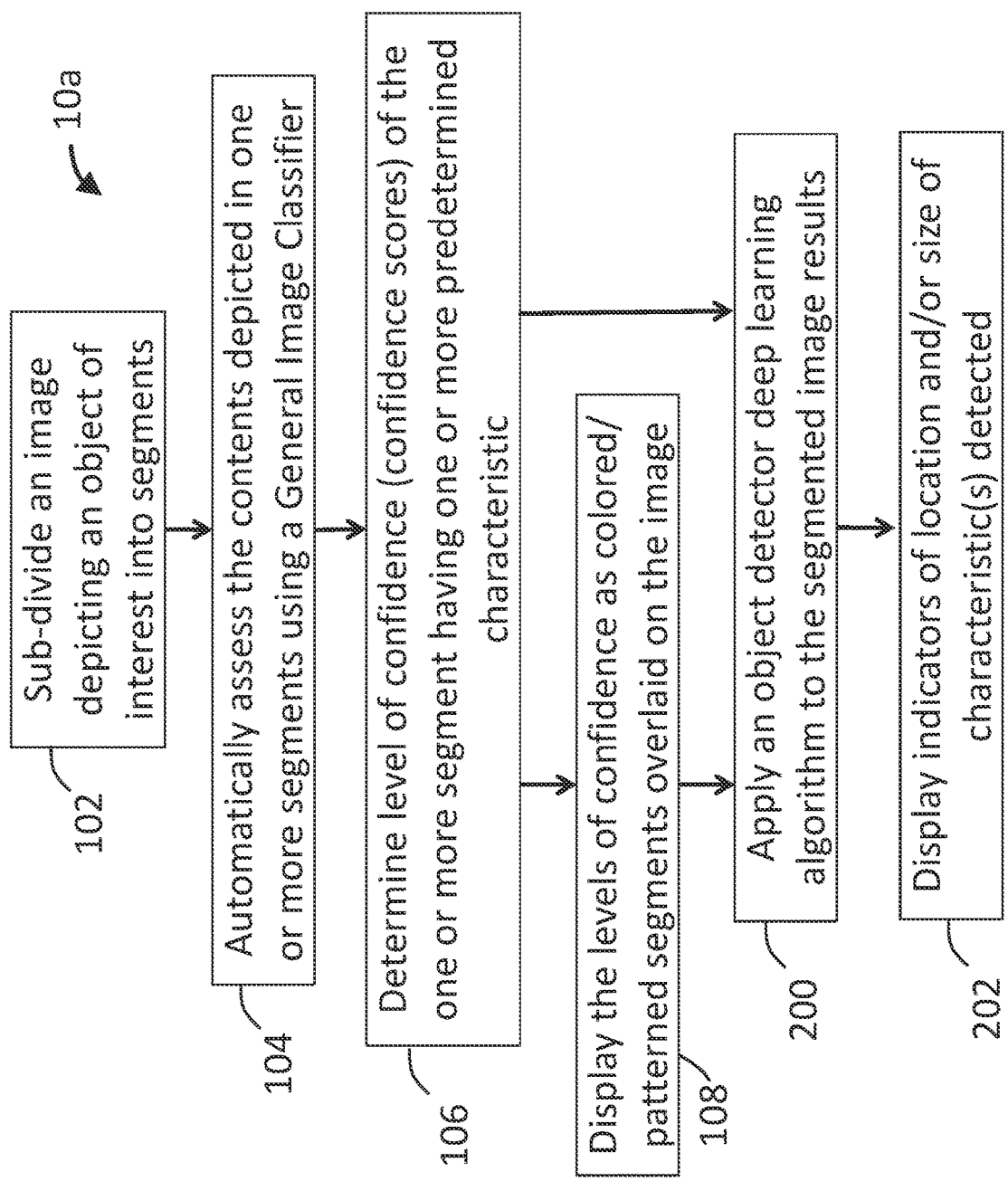
FIG. 7 is a process flow diagram an exemplary embodiment of an object characteristic estimation method in accordance with the present disclosure.

In one embodiment, as illustrated in FIG. 7, once a coarse segmentation assessment is performed as described in relation to the object characteristic estimation method 10, an indicator method 10a may be used to identify localized characteristics (such as abnormalities) or objects within the segments 16 of the image 12. In one embodiment, the indicator method 10a may have the steps of the object characteristic estimation method 10 and may further comprise a step 200 of applying an object detector deep learning algorithm (for example, single shot detection, also known as SSD) that can determine more precise, localized information within the segments 16 of the image 12. Object detector deep learning algorithms are described, for example, in the article "SSD: Single Shot MultiBox Detector" by Liu et al. (Computer Vision—ECCV 2016, Lecture Notes in Computer Science, vol. 9905), which is hereby incorporated by reference in its entirety herein.

The subsequent increased granularity provided by of the object detector deep learning algorithm of step 200 enables clear articulation and identification of precise location of the detected characteristics (such as abnormalities or objects) within the segment 16 and the image 12. The combination and fusion of multiple deep learning techniques of the indicator method 10a is less computationally intensive than other methods, but still provides results accurate enough for identification of characteristics within the image 12, for example, abnormalities (such as damage) or objects. The indicator method 10a may further comprise the step 202 of displaying indicators 220 of locations and/or size of the detected characteristics overlaid on the digital image 12.

Figure 8:
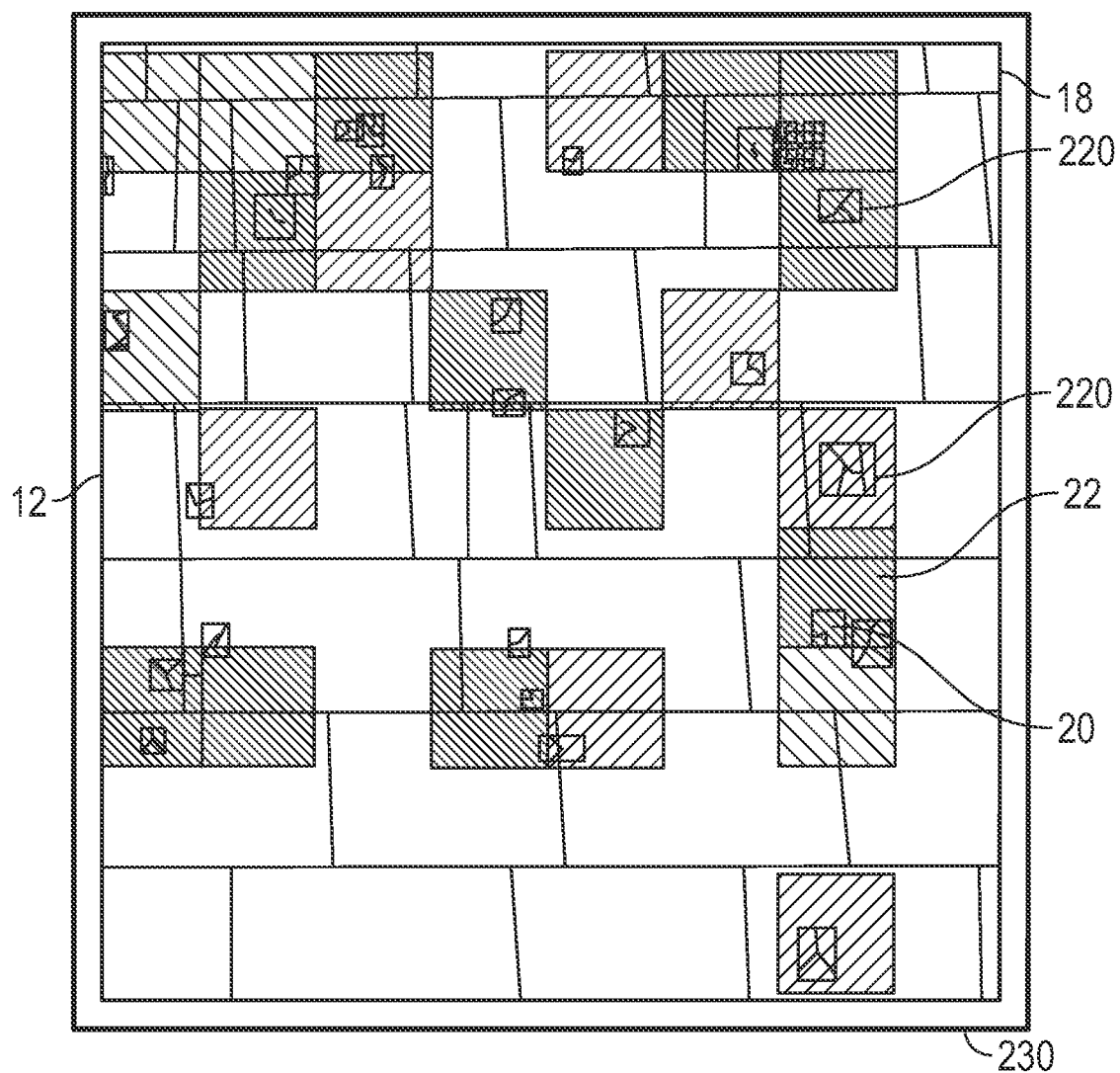
FIG. 8 is another exemplary display in accordance with the present disclosure.

For example, FIG. 8 illustrates an exemplary display of a digital image 12 in which the level of confidence that a particular segment 16 has one or more predetermined characteristic have been determined (steps 104 and 106) and the level of damage extent/severity are indicated by color (and/or pattern) overlaid on the segments 16 of the digital image 12, where "warmer" colors indicate more severe and/or extensive damage to the roof 18 (step 108). In this example, the object characteristic type is hail damage, and more specifically, predetermined levels of extent and/or severity of hail damage to the roof 18. Additionally overlaid on the image 12 are exemplary indicators 220 of locations of characteristics (in this case, the hail damage to the roof 18) detected within the segments 16 (from step 200 and step 202). In the example of FIG. 8, the indicators 220 are shown as square or rectangular outlines around the detected characteristic, that is, hail damage to the roof 18. It will be understood, however, that the indicators 220 may be other shapes and/or may be colored overlays and/or other indicative markers.

Figure 9:
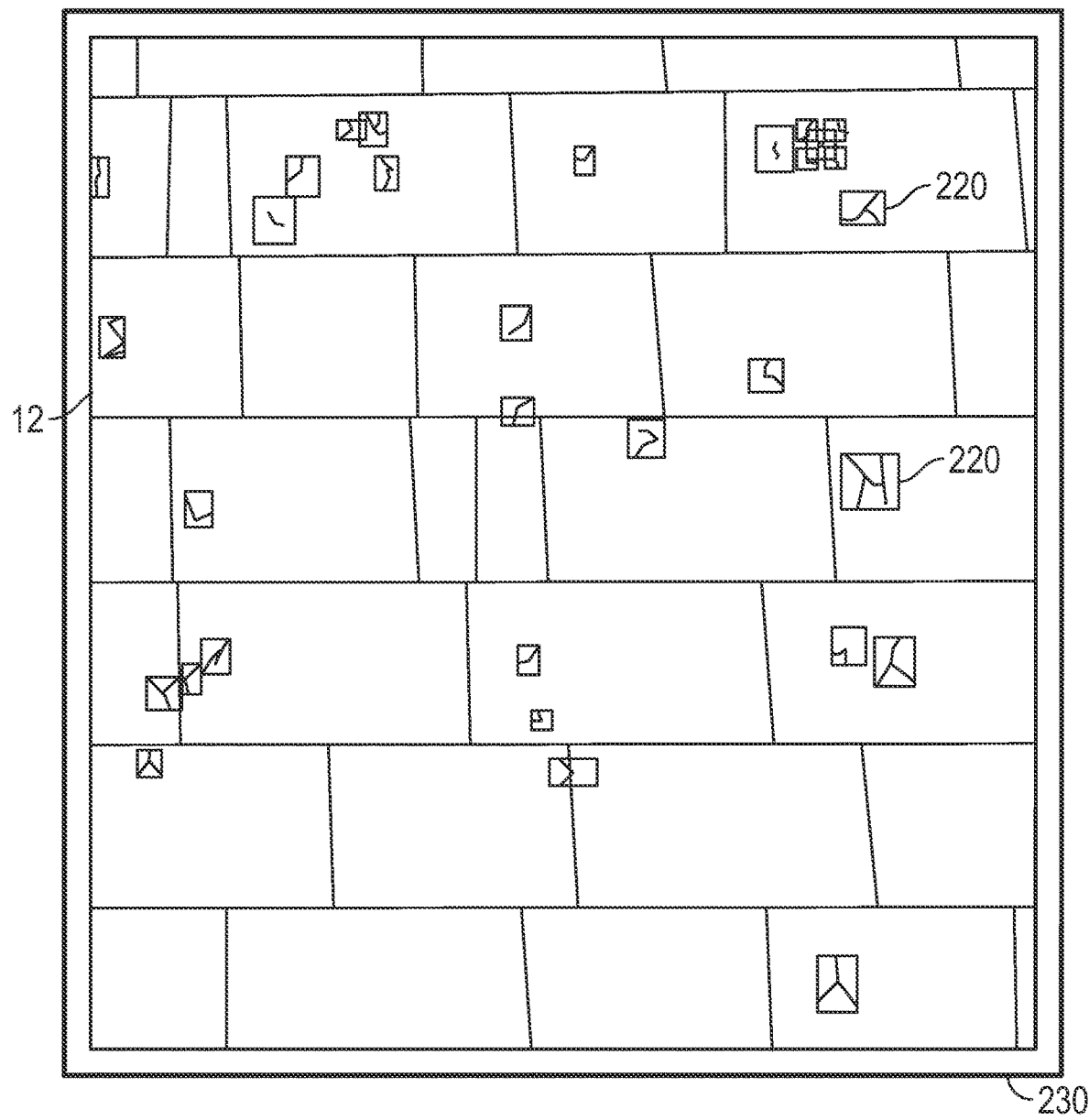
FIG. 9 is another exemplary display in accordance with the present disclosure.

As another example, FIG. 9 illustrates another display of the digital image 12 in which the indicators 220 of locations of characteristics detected (here, hail damage) within the segments 16 are shown overlaid on the digital image 12 without displaying the damage extent/severity as colored segments overlaid on the digital image 12 (that is, without step 108).

In one embodiment, the display of the one or more digital image 12 with or without the colored and/or patterned overlays indicative of object characteristic(s) and/or the indicators 220 may be digitally shown on one or more screens 230. Non-exclusive examples of screens 230 include those found with computer monitors, laptop computers, smart phones, projector systems, computer tablets, and other electronic and/or optical devices.

Figure 10:
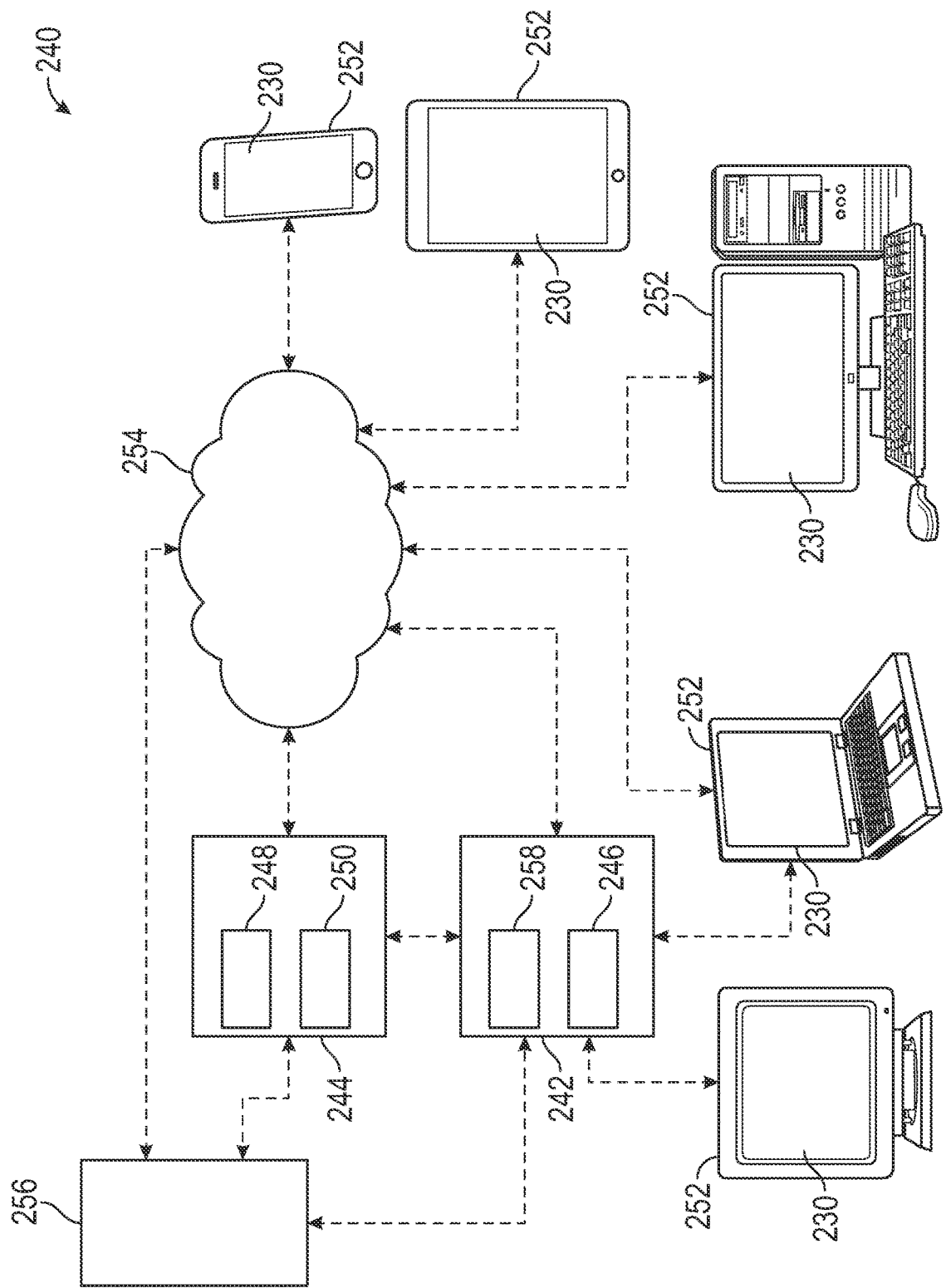
FIG. 10 is a schematic of an exemplary computer system in accordance with the present disclosure.

In one embodiment, as shown in FIG. 10, the object characteristic estimation method 10 and/or the indicator method 10a may be carried out on one or more computer system 240. The computer system 240 may comprise one or more computer processor 242, one or more non-transitory memory 244, and one or more communication component 246. The memory 244 may store one or more database 248 and program logic 250. The one or more database may comprise the digital images 12 and/or other data. Though it will be understood that the digital images 12 may be provided from outside sources and/or stored elsewhere. The computer system 240 may bi-directionally communicate with a plurality of user devices 252 and/or may communicate via a network 254. The processor 242 or multiple processors 242 may or may not necessarily be located in a single physical location.

In one embodiment, a non-transitory computer-readable storage medium 258 stores program logic, for example, a set of instructions capable of being executed by the one or more processor 242, that when executed by the one or more processor 242 causes the one or more processor 242 to carry out the object characteristic estimation method 10 and/or the indicator method 10a.

In one embodiment, the network 254 is the Internet and the user devices 252 interface with the system via the communication component and a series of web pages. It should be noted, however, that the network 254 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer system 240 comprises a server system 256 having multiple servers in a configuration suitable to provide a commercial computer based business system such as a commercial web-site and/or data center.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For exemplary purposes, examples of digital images 12 of residential structures with roof damage have been used. However, it is to be understood that the example is for illustrative purposes only and is not to be construed as limiting the scope of the invention.

The object characteristic estimation method 10 has broad implications and may apply to automatically determining the level of confidence that digital images 12 depict objects having particular characteristics. Non-exclusive examples of such characteristics include particular features, condition, wear, damage to roofs, damage to windows, damage to siding, damage to gutters, damage to roads (e.g. potholes, splits, sinkholes), damage to bridges, damage to pipelines, damage to utilities, and damage to towers. Additional non-exclusive examples of such characteristics include the presence or absence of elements of buildings or structures, such as the presence of windows, doors, gutters, and so on.

The results of the object characteristic estimation method 10 may be used for a wide variety of real-world applications. Non-exclusive examples of such applications include use of the results to provide and/or complete inspections, to evaluate condition, to repair the objects of interest 14, to create under-writing, to insure, to purchase, to construct, to value, or to otherwise impact the use of or the object of interest 14 itself.

What is claimed is:

1. A method for automatic estimation of object features from one or more digital images, comprising:
   sub-dividing into two or more segments one or more digital images comprising pixels and depicting one or more object of interest, the one or more object of interest having one or more predetermined feature, wherein each of the two or more segments comprises two or more of the pixels of the digital image, each of the two or more segments sized to be larger than the one or more predetermined feature as depicted in the digital image;
   assessing, automatically, content depicted in one or more of the segments for the one or more predetermined feature using machine learning techniques comprising General Image Classification of each of the one or more segments, wherein the General Image Classification comprises analyzing the segment as a whole and outputting a general classification for the segment as a whole as related to the one or more predetermined feature; and
   determining, automatically, a level of confidence of one or more of the segments having the one or more predetermined feature based on results of the General Image Classification.

2. The method of claim 1, further comprising displaying the level of confidence of one or more of the segments having the one or more predetermined feature as colored and/or patterned segments overlaid on one or more of the digital images.

3. The method of claim 1, wherein assessing, automatically, contents depicted in one or more of the segments is assessing, automatically, contents depicted in two or more of the segments, the method further comprising aggregating results of the assessing and the determining for the two or more segments.

4. The method of claim 1, wherein the one or more predetermined feature comprises levels of extent of one or more type of feature.

5. The method of claim 1, wherein number of segments from sub-dividing the one or more digital images into two or more segments is based at least in part on the predetermined feature.

6. The method of claim 1, wherein number of segments from sub-dividing the one or more digital images into two or more segments is based at least in part on a resolution of the one or more digital images.

7. The method of claim 1, further comprising:
   analyzing one or more of the segments using an object detector deep learning algorithm to determine a location and/or size of the one or more predetermined feature within the one or more segments.

8. The method of claim 7, further comprising displaying one or more visual indicator of location and/or size of the one or more predetermined feature within the one or more segments overlaid on one or more of the digital images.

9. A computer system having a non-transitory computer readable storage medium storing computer readable instructions that, when executed by a processor of the computer system, cause the computer system to perform the following:
   sub-dividing into two or more segments one or more digital image comprising pixels and depicting one or more object of interest, the one or more object of interest having one or more predetermined feature, wherein each of the two or more segments comprises two or more of the pixels of the digital image, each of the two or more segments sized to be larger than the one or more predetermined feature;
   assessing contents depicted in one or more of the segments for the one or more predetermined feature using machine learning techniques comprising General Image Classification of the one or more segments, wherein the General Image Classification comprises analyzing the segment as a whole and outputting a general classification for the segment as a whole as related to the one or more predetermined feature; and
   determining a level of confidence of one or more of the segments having the one or more predetermined feature based on results of the General Image Classification.

10. The computer system of claim 9, wherein the non-transitory computer readable storage medium stores computer readable instructions that, when executed by the processor of the computer system, cause the computer system further to display the level of confidence of one or more of the segments having the one or more predetermined feature as colored and/or patterned segments overlaid on one or more of the digital images.

11. The computer system of claim 9, wherein assessing contents depicted in one or more of the segments is assessing contents depicted in two or more of the segments, and wherein the non-transitory computer readable storage medium stores computer readable instructions that, when executed by the processor of the computer system, cause the computer system further to aggregate results of the assessing and determining for the two or more segments.

12. The computer system of claim 9, wherein the one or more predetermined feature comprises levels of extent of one or more type of feature.

13. The computer system of claim 9, wherein the non-transitory computer readable storage medium stores computer readable instructions that, when executed by the processor of the computer system, causes the computer system further to perform the following:
   analyzing one or more of the segments using an object detector deep learning algorithm to determine a location and/or size of the one or more predetermined feature within the one or more segments.

14. The computer system of claim 13, wherein the non-transitory computer readable storage medium stores computer readable instructions that, when executed by the processor of the computer system, cause the computer system further to perform the following:
   displaying the level of confidence of one or more of the segments having the one or more predetermined feature as colored and/or patterned segments overlaid on one or more of the digital images; and
   displaying one or more visual indicator of location and/or size of the one or more predetermined feature within the one or more segments overlaid on one or more of the digital images.

15. The computer system of claim 9, wherein the non-transitory computer readable storage medium stores computer readable instructions that, when executed by the processor of the computer system, cause the computer system further to perform the following:

displaying one or more visual indicator of location and/or size of the one or more predetermined feature within the one or more segments overlaid on one or more of the digital images.

16. A computer system having a non-transitory computer readable storage medium storing computer readable instructions that, when executed by a processor of the computer system, cause the computer system to perform the following:

sub-dividing a digital image having pixels depicting a building having one or more windows into two or more segments, wherein a first segment of the two or more segments includes two or more first pixels depicting a first portion of the building, and a second segment of the two or more segments includes two or more second pixels depicting a second portion of the building, each of the two or more segments sized to be larger than the one or more windows depicted in the digital image;

assessing contents depicted in one or more of the segments for a presence of the one or more windows using machine learning techniques comprising General Image Classification, wherein the General Image Classification comprises analyzing the segment as a whole and outputting a general classification for the segment as a whole as related to the presence of the one or more windows; and determining a level of confidence of one or more of the segments having the presence of the one or more windows based on results of the General Image Classification of the one or more segments.

17. The computer system of claim 16, wherein assessing contents depicted in one or more of the segments is assessing contents depicted in two or more of the segments, and wherein the non-transitory computer readable storage medium stores computer readable instructions that, when executed by the processor of the computer system, cause the computer system further to aggregate results of the assessing and determining steps for the two or more segments.

18. The computer system of claim 17, wherein the computer readable instructions, when executed by the computer system, cause the computer system further to overlay semi-transparent colored segments on the digital image, the semi-transparent colored segments indicative of a level of confidence of the presence of the one or more windows.

19. The computer system of claim 18, wherein color used in a particular segment is indicative of the level of confidence of the presence of the one or more windows in the particular segment of the two or more of the segments.

20. The computer system of claim 16, wherein the computer readable instructions, when executed by the computer system, cause the computer system to analyze the one or more segments using an object detector deep learning algorithm to determine a location and/or size of the one or more windows within the one or more segments.

* * * * *